Oct. 7, 1930.  P. R. HOOPES  1,777,849
MACHINE FOR MAKING CLOCK PINIONS
Filed March 9, 1927  8 Sheets-Sheet 2

Inventor
Penrose R. Hoopes
by
W. Clay Lindsey
His Attorney

Oct. 7, 1930.   P. R. HOOPES   1,777,849
MACHINE FOR MAKING CLOCK PINIONS
Filed March 9, 1927   8 Sheets-Sheet 3

Inventor
Penrose R. Hoopes
by H. Clay Lindsey
His Attorney

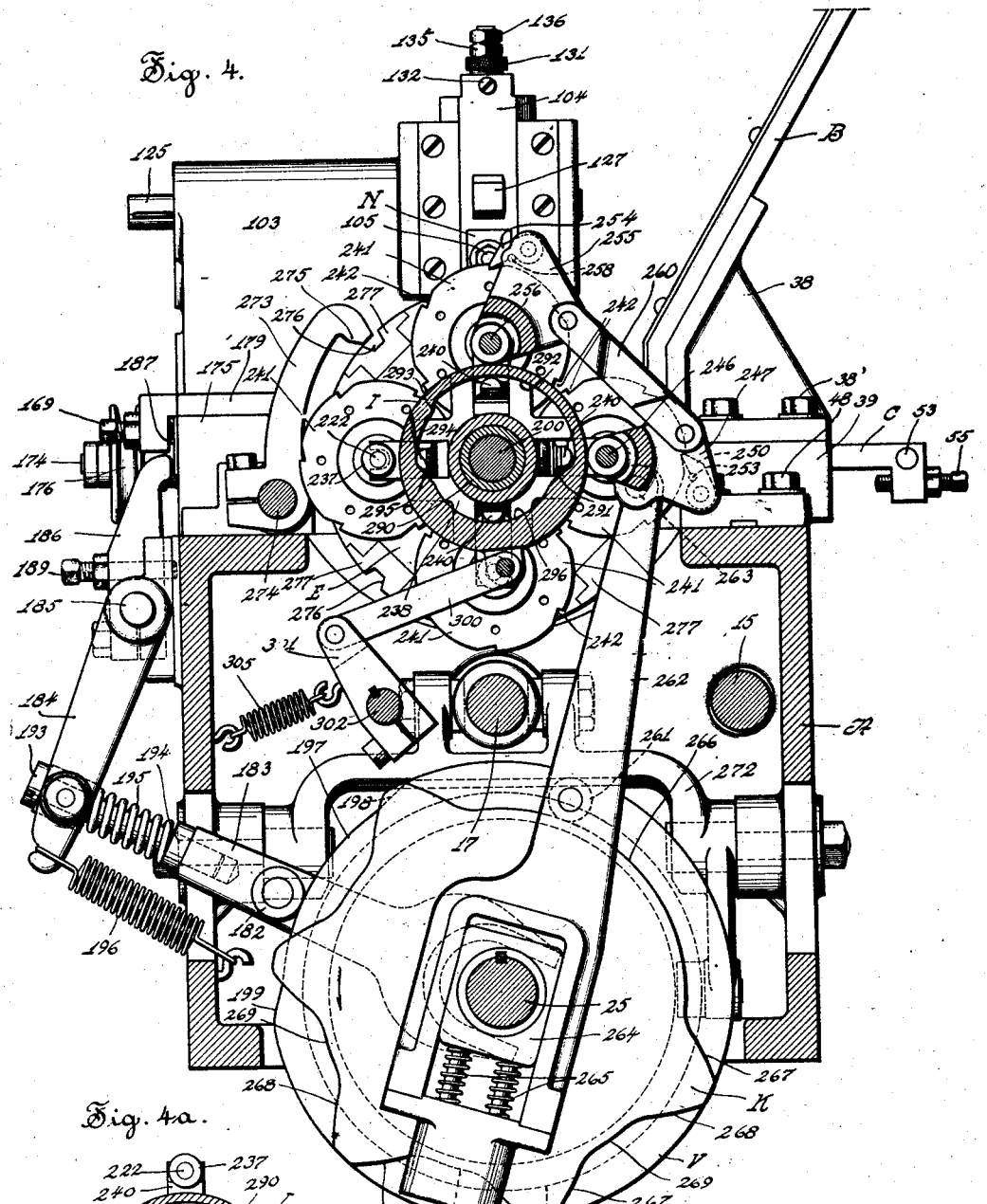
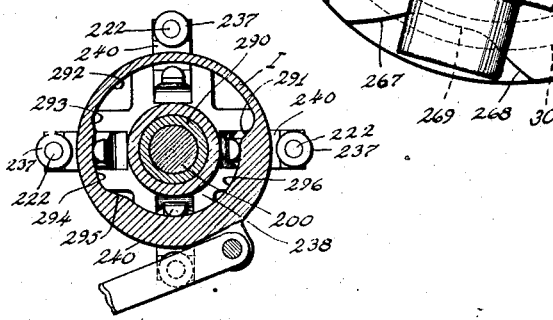

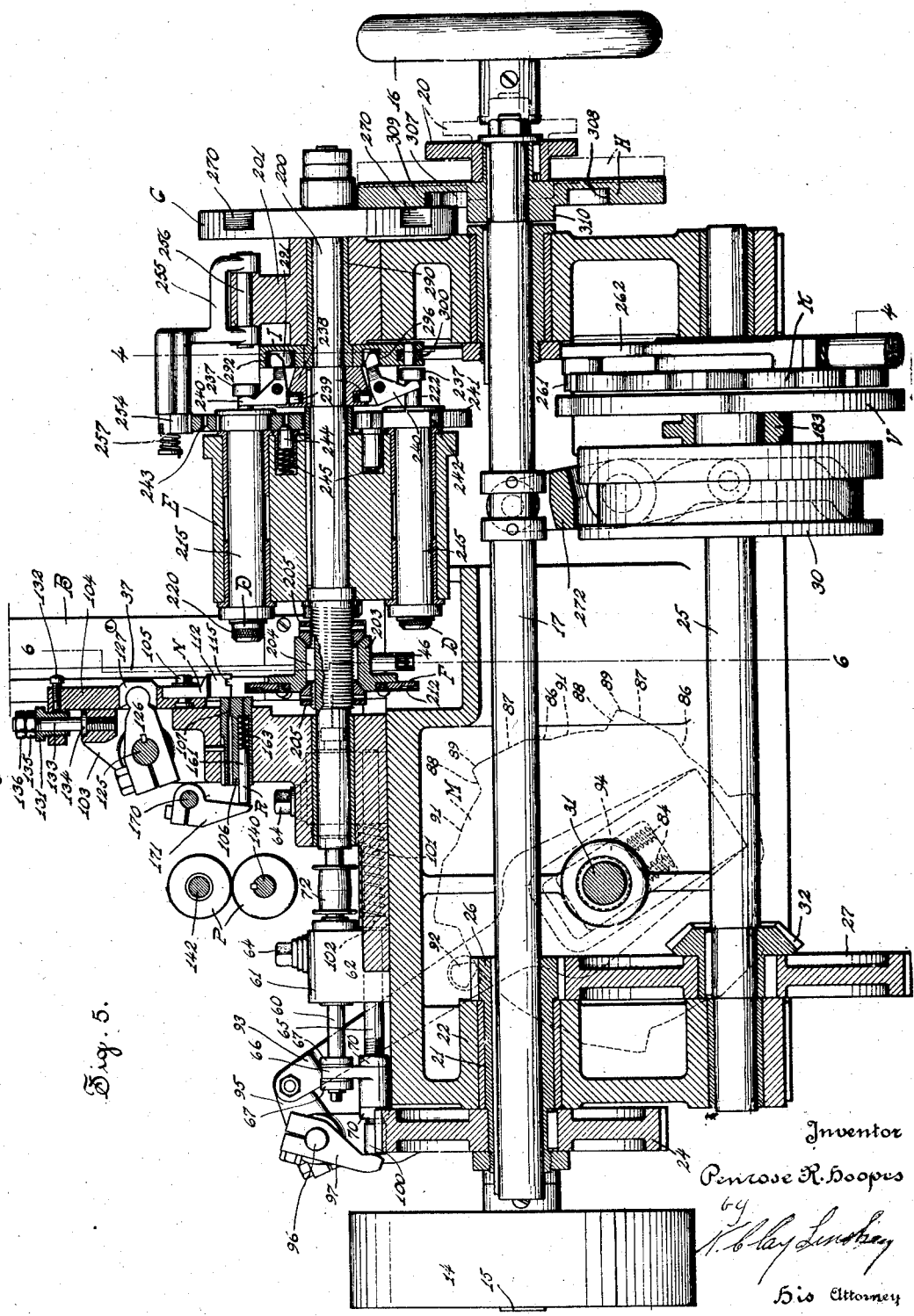

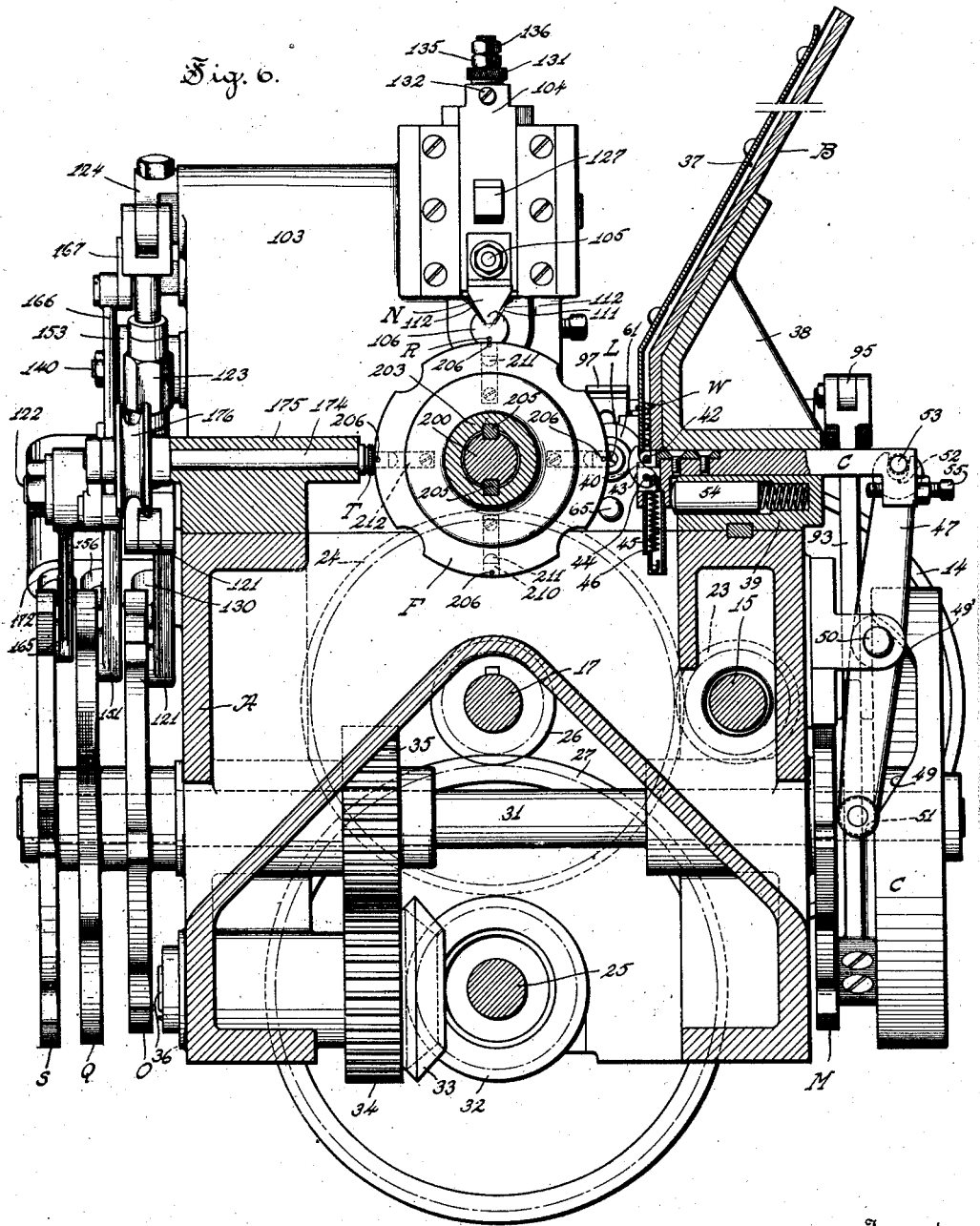

Oct. 7, 1930.                P. R. HOOPES                1,777,849
                   MACHINE FOR MAKING CLOCK PINIONS
                    Filed March 9, 1927        8 Sheets-Sheet 7

Inventor
Penrose R. Hoopes
by
W. Clay Lindsey
Attorney

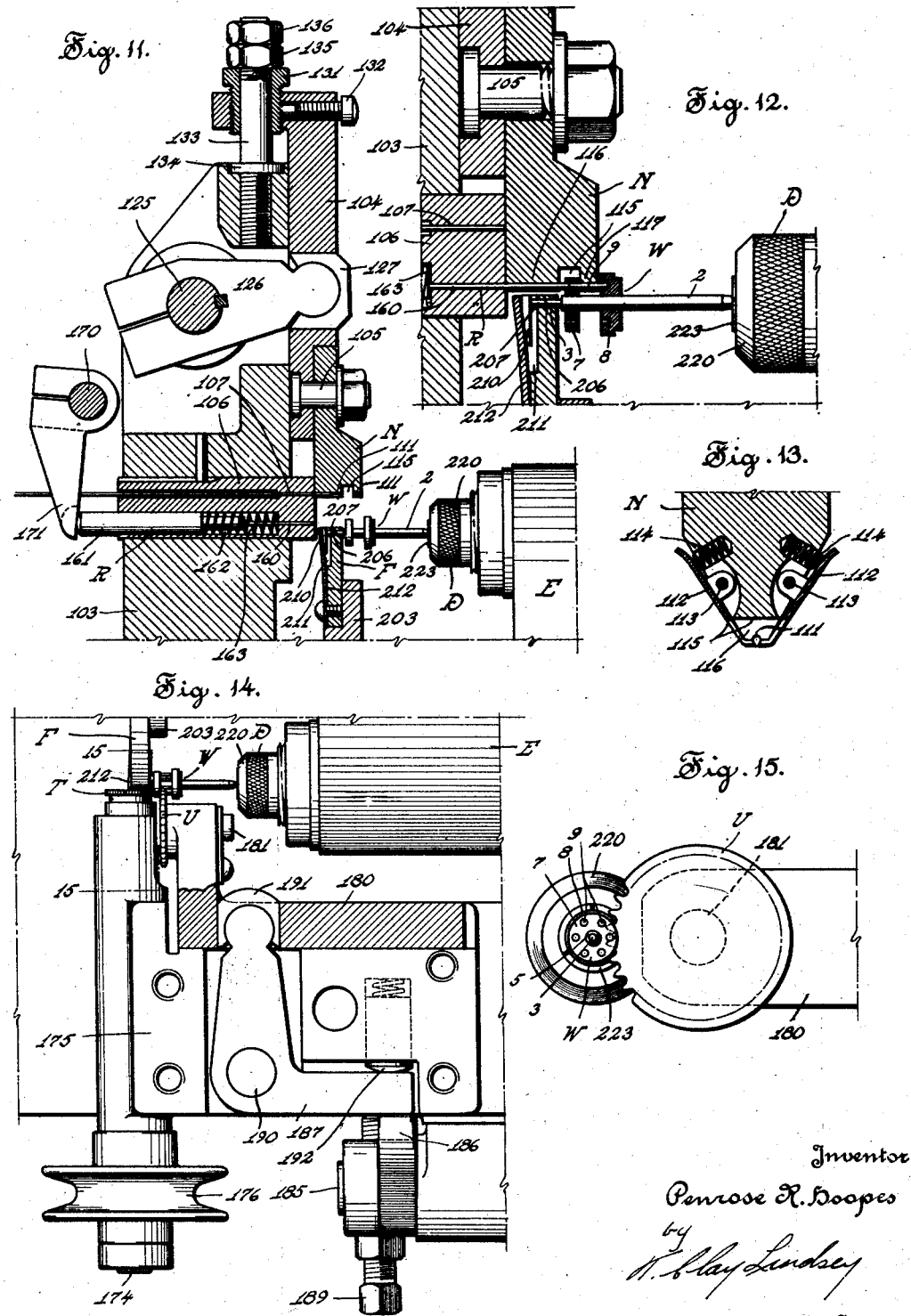

Patented Oct. 7, 1930

1,777,849

UNITED STATES PATENT OFFICE

PENROSE R. HOOPES, OF HARTFORD, CONNECTICUT, ASSIGNOR TO WILLIAM L. GILBERT CLOCK COMPANY, OF WINSTED, CONNECTICUT, A CORPORATION OF CONNECTICUT

MACHINE FOR MAKING CLOCK PINIONS

Application filed March 9, 1927. Serial No. 173,885.

This invention relates to a machine, entirely automatic in its nature, for drilling the collars or collets of clock pinions of the lantern type, filling the drilled collars with short wires which form the leaves, and then fastening the wires in place by a staking or knurling operation, the object being to provide a machine for this purpose having various features of novelty and advantage.

More particularly, an aim of the invention is to provide a machine which is very simple and effective in construction, arrangement and operation and by means of which the drilling, filling and fastening operations may be very accurately and rapidly carried out with the result that superior clock pinions are produced at a relatively low cost.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

It is to be understood that while I have shown but one embodiment of my invention in the accompanying drawings, this showing is by way of exemplification only, the invention being susceptible of various modifications and changes in construction, arrangement and operation which would be within the spirit of the invention, and certain of the novel features and characteristics may be employed in other combinations than those herein described. Furthermore, the invention resides in the methods recited in the appended claims.

In said drawings:

Fig. 4 is a vertical transverse sectional view taken substantially on line 4—4 of Fig. 5;

Figure 1:
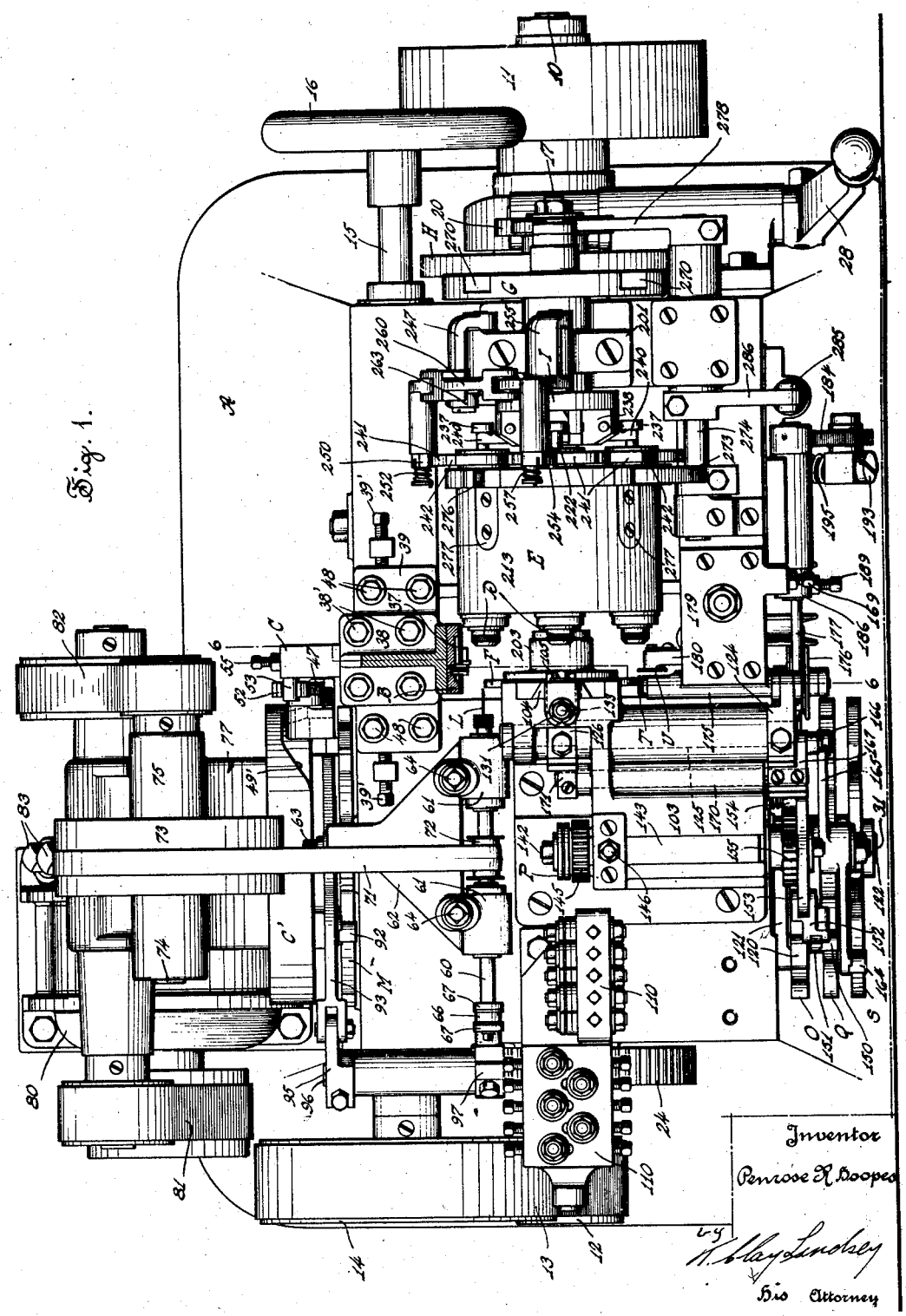
Figure 1 is a top plan view of the machine.
Figure 2:
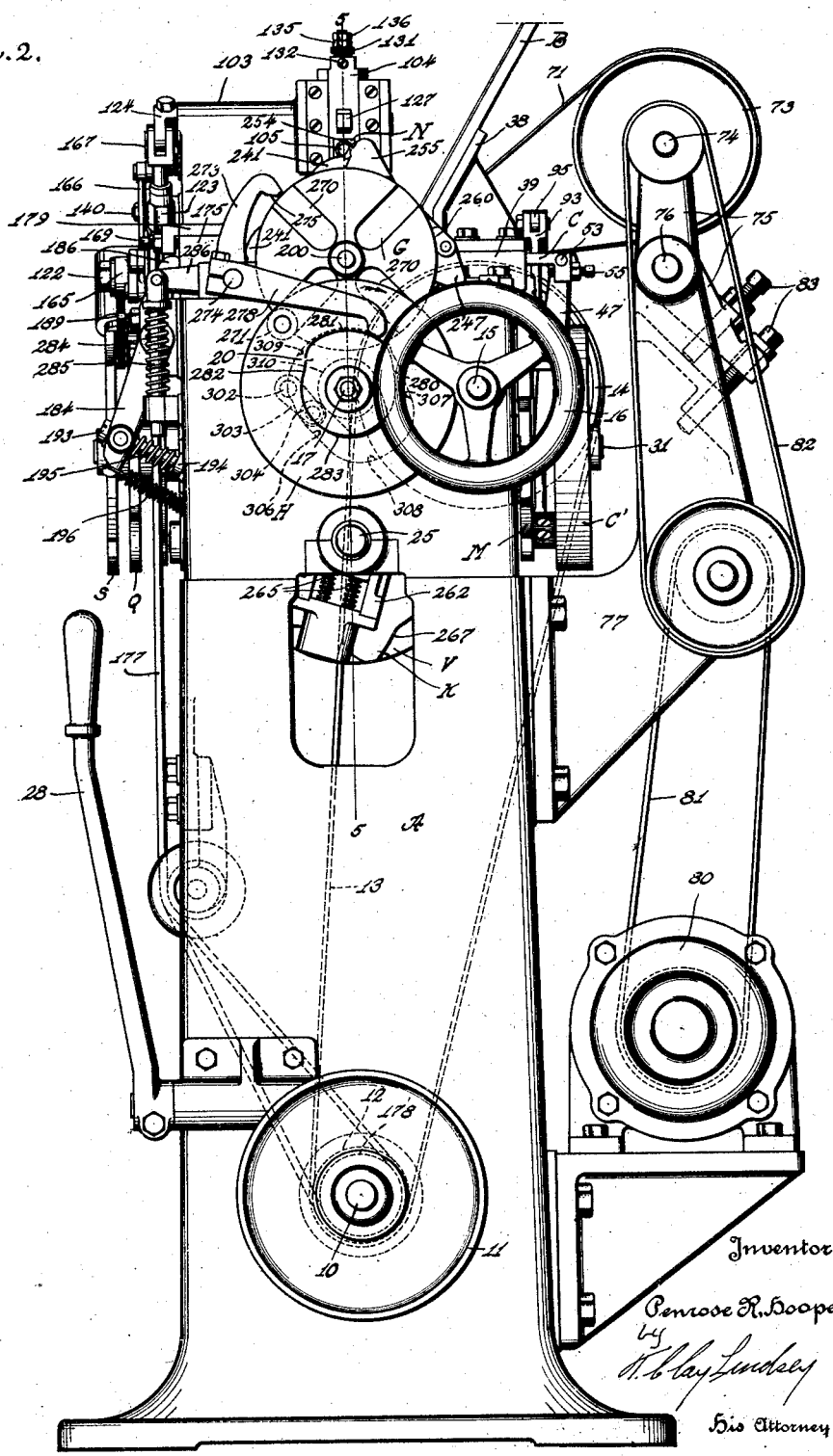
Fig. 2 is an elevational view of the right hand end of the machine.
Figure 7:
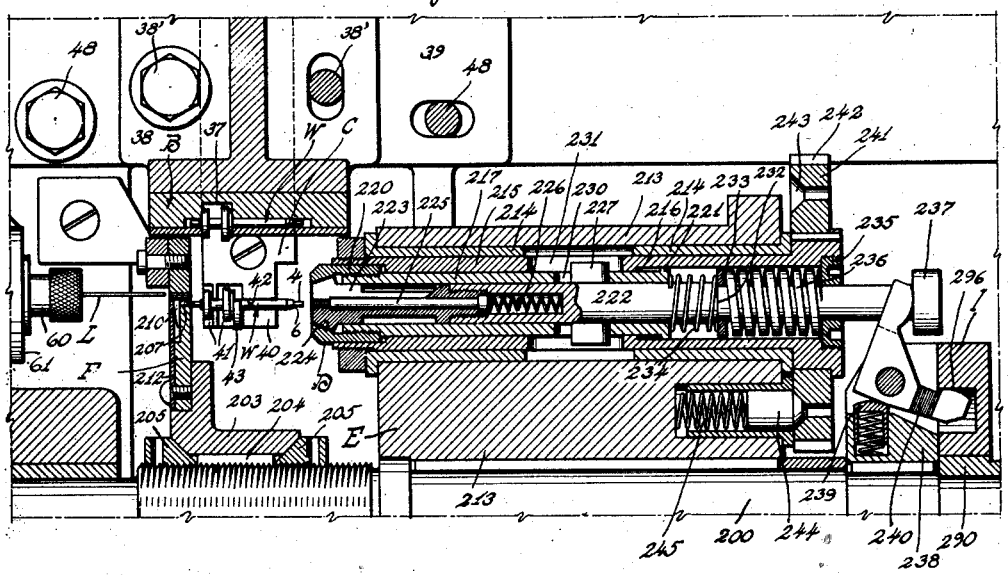
Figure 8:
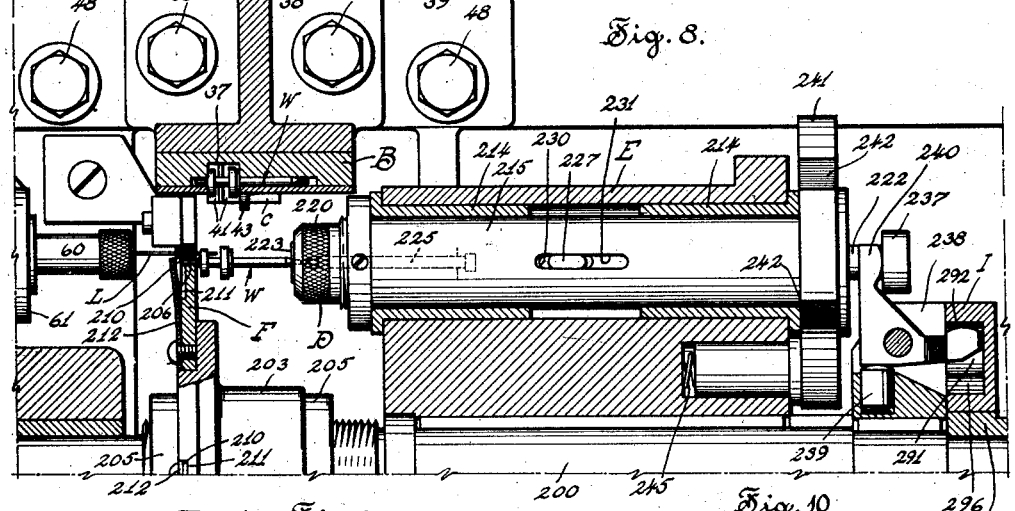
Figures 9, 10:
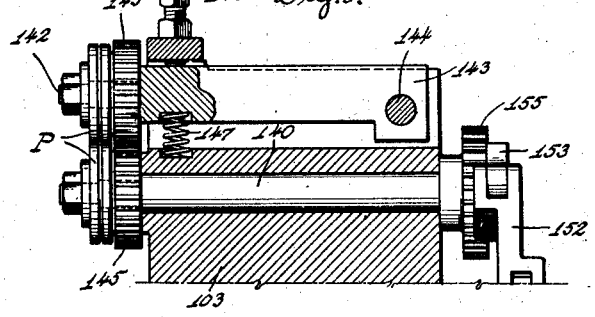

Fig. 4$^a$ is a detail view of the cam for operating the chucking collets;

Fig. 5 is a vertical sectional view taken substantially on the center line of the machine, that is on line 5—5 of Fig. 2;

Fig. 6 is a vertical transverse sectional view, this view being taken substantially on line 6—6 of Fig. 1;

Fig. 7 is a view taken on a horizontal plane through the center of the turret and illustrates the condition of the spring collet member at the drilling position before the collet has been engaged with the pinion blank which has been moved into aligned relation with the collet by the feed mechanism;

Fig. 8 is a view similar to Fig. 7 but illustrating the collet as chucking the pinion blank;

Fig. 9 is a detail view of the mechanism for feeding the wire to the cut-off mechanism;

Fig. 10 is a perspective view of one of the completed clock pinions;

Fig. 11 is a vertical sectional view through the cut-off mechanism and the means for inserting the severed wires into the drilled pinion blank, a portion of one of the chucking collets at the filling position being illustrated;

Fig. 12 is a view similar to Fig. 11 but illustrating the cut-off mechanism as having delivered a severed wire to a position where it may be inserted into the drilled collars of the pinion blank, and the wire inserting means being shown as having inserted the wire into the collars;

Fig. 13 is a sectional view through the cut-off tool and illustrates the fingers for holding the severed wires in alignment with the drilled holes of the pinion collars during the operation of inserting the wires into the collars;

Fig. 14 is a detail view showing the knurling mechanism for securing the inserted wires in place; and Fig. 15 is a view taken substantially on line 15—15 of Fig. 14 and illustrates the gear cooperating with the clock pinion for holding one of the collars thereof against the knurling tool.

In order that the detailed description which is to follow may be better understood, a general description of the mechanisms of the machine and the mode of operation thereof will here be given.

The machine has a bed A on the top and at the rear of which is mounted a magazine B from which the pieces of work W (each of which is in the form of a staff having a pair of spaced collars thereon) are fed one by one by a feed slide C to an indexible carrier having a plurality of pairs of centers, one center of each pair being in the form of a chuck or collet D. The feed slide is controlled by a cam C'. In the present instance, the carrier comprises an indexible turret E provided with four collet mechanisms D spaced apart at 90°, and a plate F having four centers respectively aligned with the collets. The carrier has four indexed positions so as to successively bring each collet to a drilling position at which the pinion blanks are delivered to the collet by the feed slide C and the drilling operations are effected, a wire filling position at which the wire is cut off and then inserted into the drilled holes of the pinion collars, and then to a knurling position at which the inserted wires are secured in place. While the turret is moving to the fourth indexed position, the completed work is ejected. The turret is indexed by a Geneva motion device which includes a driven member in the form of a slotted index plate G. The collets are operated to grip and release the work in proper timed relation to other mechanisms by a collet operating cam I controlled by a cam H. The chucking collets in both the drilling position and the filling position are indexed about their own axes in accordance with the number of leaves with which the pinion is to be provided, and this indexing movement is effected by means of a collet index cam K. In the present illustrative disclosure, wherein it is assumed that the pinions are provided with six leaves or wires, the collets are indexed to six positions at the drilling position and the filling position but, obviously, this disclosure is by way of illustration only and the number of times that the collets are thus indexed at these positions will depend upon the number of leaves with which the pinions are to be provided, and these leaves may be more or less than six in number.

After a pinion has been chucked by the collet at drilling positon, the drill L, which is constantly rotated at a high speed, is advanced to drill a hole and then withdrawn, the collet is indexed about its own axis, the drill is again advanced and then withdrawn, and so on until six holes have been drilled in the pinion collars, the movement of the drill being controlled by the drill feed cam M. After the six holes have been drilled at drilling position, the turret is indexed 90° to carry the drilled pinion to the filling position whereupon the cut-off tool N, controlled by a cam O, will cut off a wire which has been fed to the cut-off mechanism by wire feeding rolls P controlled by a cam Q. After the wire has been cut off, the cut-off tool carries the same into alignment with a drilled hole in the pinion collars and then the wire is ejected from the cut-off tool and inserted into the drilled holes of the pinion collars by an inserter R controlled by a cam S. After one wire is inserted, the collet at filling position is indexed 60° in the present instance, and the cut-off tool and inserter operate to cut off the desired length of wire and insert the same into the second set of drilled holes of the pinion collars, and this sequence of operations is repeated until all of the drilled holes have been filled. Then the turret is indexed to bring the filled pinion to knurling position and, in this position, one of the collars of the pinion is held against a knurling tool T by a backing member in the form of a gear U which is controlled by a cam V. The turret is again indexed whereupon the completed work is released from the turret. It is, of course, understood that, during the drilling of a pinion blank at drilling position, a drilled pinion is being filled at filling position and a filled pinion is being knurled at knurling position, and the various operations are so timed as to be expediently and rapidly carried out so that the machine has a high rate of production.

Obviously, the machine is not limited in its use for drilling, filling and knurling lantern pinions of one specific size and arrangement, but in order that the operation of the machine may be more clearly understood as the description proceeds, a completed pinion W is illustrated in Fig. 10. This pinion has a staff 2 provided at its respective ends with pivots 3 and 4 and shoulders 5 and 6. The collars are designated by the numerals 7 and 8, and the leaves by the numeral 9.

Referring now more specifically to the construction, the general arrangement and location of the shafts on which the various cams are mounted will first be described. It is, of course, understood that the various shafts may be driven in any suitable manner, and the arrangement disclosed in the drawings is by way of illustration only. The main shaft, designated by the numeral 10, is journalled in the lower portion of the bed and carries on its right hand end a pulley 11 by means of which the shaft may be driven. On the left hand end of the main shaft (see Figs. 1 and 2) is a pulley 12 connected by a belt 13 to a pulley 14 on a drive shaft 15 which may carry on its left hand end a hand wheel 16 by means of which the machine may be turned over by hand if desired. Immediately in front of the drive shaft is a shaft 17 mounted for both rotary and longitudinal reciprocating movements, and this shaft carries on its right hand end the collet controlling cam H, the driving member of the Geneva motion device for indexing the turret, and a cam 20 which controls the means for locking the turret in indexed position. The shaft 17, as will be seen from Fig. 5, is keyed to, so as to rotate with but slide in, a sleeve 21 suitably journalled in a bearing 22 on the bed. This sleeve is driven from the drive shaft through the pinion 23 and a gear 24. Immediately beneath the reciprocating shaft 17 is a cam shaft 25 which is driven from the sleeve 21 through the pinion 26 and a gear 27, as most clearly shown in Figs. 5 and 6. Fixed to this shaft 25 within the bed are the cam K for indexing the collets at drilling and filling positions, the cam V which controls the gear for moving the filled pinion against the knurling tool T, and a cam 30 for reciprocating the shaft 17 (see Fig. 5). The shaft 17 is driven at the ratio of one to four with respect to the shaft 25, and the shaft 17 is reciprocated so as to engage and disengage the Geneva motion turret indexing device, as hereinafter described more in detail. Extending transversely through the bed of the machine is a shaft 31 which is driven at a ratio of one to one from the shaft 25 through the bevel gears 32 and 33 and the pinions 34 and 35, as will be seen most clearly from Fig. 6. The bevel gear 33 and the pinion 34 are suitably journalled on a fixed stud 36. The shaft 31 carries on its forward end the cams Q, O and S which respectively control the feeding of the wire to the cut-off tool, the cut-off tool and the inserter for delivering the severed wire from the cut-off tool to the drilled pinion at filling position. On the rear end of this transverse shaft 31 are the cam M for controlling the drill, and the cam C' for controlling the slide C which delivers the pinion blanks from the magazine B to the collets D at drilling position. On the main shaft 10 is a clutch which may be operated by a handle 28 (see Fig. 2) to start and stop the machine. The clutch is not shown in detail, as it may be of any suitable construction.

The magazine B and the means including the slide C for feeding the blanks to the collet at drilling position will now be described. The magazine B is mounted on the top of the bed of the machine immediately to the rear of the drilling position of the collets. It has a channel 37 in which the pinion blanks are superimposed. The magazine B is fixed to a bracket 38 which is mounted for adjustment radially of the turret on a base 39. The bracket is clamped in adjusted position on the base by screws 38'. The base 39 is mounted on the bed A for adjustment longitudinally of the turret. The base may be thus adjusted by screws 39' and may be secured in adjusted position by screws 48. At the lower end of the magazine and mounted in the base 39 is the feed slide C having, at its forward end, a shelf 40 which is slotted or grooved as at 41 (see Figs. 7 and 8) so as to accommodate the collars 7 and 8 on the pinion blanks delivered from the magazine channel to this shelf. At the rear end of the shelf is a vertical abutment 42, and each pinion blank, as it is delivered by the slide to the collet and while the pinion blank is being engaged by the collet, is held in the angle between the shelf and the abutment 42 by a pawl 43 so as to insure that the pinion blank, during the chucking operation, is in alignment with the center of the collet and the aligned center in the plate F. This pawl is hinged to the slide C as at 44 and is urged in a direction to engage the pinion blank on the shelf by a spring 45 located in a tube 46 carried by and depending from the forward end of the slide. When the slide C is in pinion receiving position, as shown most clearly in Fig. 6, the free end of the pawl is engaged with the front face of the magazine so that the pawl will not interfere with the lowermost pinion blank dropping by gravity from the magazine onto the shelf 40. When the slide C is moved forwardly, the spring 45 urges the pawl into engagement with the pinion blank on the shelf, and the slide, rearwardly of the shelf, closes the lower end of the channel in the magazine. After the pinion blank has been engaged by the collet D, which is at drilling position, the slide is withdrawn, and the pawl will swing down and ride out of engagement with the chucked pinion blank.

The feed slide C is controlled in its movements by the cam C' operating through a lever 47 pivoted as at 50 and having, on its lower end, a roller 51 engaging against the cam surface of the cam C', as shown most clearly in Fig. 6. The upper end of the lever 47 is slotted or bifurcated, as at 52, so as to receive a pin 53 extending laterally from the slide C. The cam C' withdraws or retracts the slide to the position shown in Fig. 6, and the slide is urged to delivery position by the spring pressed plunger 54 carried by the base 39. For the purpose of limiting the extent to which the slide can be moved forwardly by the spring pressed plunger 54, there is provided in the rear end of the slide an adjustable screw 55 adapted to engage the rear end of the base 39. It is of advantage to move the slide from receiving to delivery position by the spring pressed plunger 54 rather than positively, in that should the pinion blank jam, none of the parts would be broken. Since the magazine is adjustable radially and longitudinally of a collet at drilling position, and the extent of forward movement of the slide is adjustable with respect to the base 39, the parts may be set to accommodate pinion blanks of different dimensions with the assurance that these blanks will be delivered with accuracy to the collet at drilling position. As hereinafter described more in detail, the cam C' is so constructed and arranged that the movements of the slide C are timed with respect to the other mechanisms so that there is no loss of time in feeding the pinions to the drilling position of the collets. This cam has a portion 49 along which the roller 51 rolls while the slide is advancing, and a portion 49′ for retracting the slide.

The drilling mechanism will now be described, particular reference being had to Figs. 1 and 5. The drill L is carried by a constantly driven spindle 60 journalled for sliding and rotary movements in bearings 61 carried by an adjustable bracket 62. The axis of the drill is parallel to the axis of the collet at drilling position and is spaced from that axis a distance corresponding to that at which the holes are to be drilled in the collars of the pinions from the axis of the pinions. The bracket 62 is adjustable so as to radially adjust the drill spindle in accordance with the size of the pinions operated upon. In the present instance, the bracket may be adjusted by a screw 63 and clamped in adjusted position by screws 64. Mounted for sliding movement in the bracket immediately beneath the drill spindle 60 is a longitudinal reciprocating rod 65 connected to the drill spindle by a member 66. To each side of the member 66 and on the drill spindle are antifriction thrust bearings 67. The member 66 is adjustable longitudinally of the rod 65 so as to vary the depth to which the drill goes into the pinion collars 8, in the present instance this adjustment being provided for by nuts 70 between which the member 66 is located. The drill spindle is constantly driven at a high rate of speed by a belt 71 passing about a drill spindle pulley 72 and a pulley 73 fixed to a shaft 74 journalled in an adjustable bracket 75 pivoted as at 76 to a bracket 77 secured to the rear of the bed. The shaft 74 is driven from the motor 80 (see Fig. 2) through the belts 81 and 82. The bracket 75 is adjustable by means of screws 83 so as to vary the tension of the belt 71.

The drill spindle is controlled in its movements by the cam M fixed adjacent to the rear end of the shaft 31, the arrangement being such that the drill spindle is positively fed to and into the work by this cam. In the present illustrative disclosure, the cam M, as most clearly shown in Fig. 5, is provided with six lobes so arranged that the drill is initially fed rapidly, then more slowly during the drilling operation, and then may be quickly withdrawn by the spring 101. The portions 86 of the lobes initially feed the drill, the portions 87 feed the drill during the drilling operation, and the portions 88 permit of a quick return of the drill. The tops of the lobes, as at 89, provide for a momentary dwell of the drill in full forward position so as to insure clearing of the chips from the drilled holes. Between the lobes, the cam M has concentric portions 91 and, while the cam follower is riding on these concentric portions, the drill is in retracted position and, during this time, the collet at drilling position is being indexed. One of the concentric portions 91, namely that portion with which the follower is in engagement in Fig. 5, is relatively longer than the other portions 91 so as to allow for the time required in indexing the turret and chucking a new pinion blank at drilling position. The cam follower, designated by the numeral 92, is carried by a fork 93 which is guided, adjacent its lower end, by a guide block 94 journalled on the shaft 31. The springs 84 are interposed between the guide block and the fork in such manner as to maintain the follower against the periphery of the cam M. The upper end of the fork 93 is pivotally connected to an arm 95 fixed on the rear end of a shaft 96 on the forward end of which is fixed an operating arm 97 which engages against a cap 100 on the left hand end of the rod 65. The rod 65 is maintained in engagement with the arm 97 by a spring 101 interposed between a portion of the bracket 62 and a collar 102 on the rod. This spring retracts the rod 65 and the drill spindle when the follower 92 rides off of the lobes onto the portions 91.

The mechanisms at filling position will now be described. Fixed to the top of the bed of the machine is a bracket 103 on which is mounted for vertical movement a slide 104 to which is secured by a bolt 105 the cut-off tool N. Carried by the bracket is a quill 106 having an opening 107 through which a wire is fed to cut-off tool. The wire is drawn through suitable straightening devices 110 which need no specific description as they may be of a well-known type. The feed rolls P draw the wire through the straightening devices and feed it to the desired length through the opening 107 to the cut-off tool. Mounted in the quill 106 immediately beneath the opening 107, and in alignment with one set of drilled openings in the pinion collars at filling position, is the inserter R which forces the severed wire from the cut-off tool into the drilled holes of the collars.

The cut-off tool has, at its lower end, as most clearly shown in Figs. 11, 12 and 13, a groove 111 to which the wire is fed and in which the wire is held by spring clips 112. These clips, in the present illustrative disclosure, are pivoted to the cut-off tool as at 113 and are urged by springs 114 in a direction to hold the wire in place in the groove 111. The cut-off tool and the spring clips are notched as at 115, thus providing at the lower end of the cut-off tool two portions, one portion 116 being adapted to engage between the quill and the front collar 7 on the pinion at filling position, and the other portion 117 being adapted to engage between the collars 7 and 8 of the pinion, as shown in Fig. 12. The slot or notch 115 accommodates the foremost collar on the pinion when the cut-off tool is in the delivery position shown in that figure. The purpose of providing the portion 117 is to maintain the severed wire, as it is being inserted into the drilled holes of the collars, in proper alignment with those holes.

It will be understood that a suitable length of wire will be delivered by the feed rolls P to portion 116 of the cut-off tool when that tool is in the receiving position shown in Fig. 11. Then the tool is lowered, and the left hand edge of the cut-off tool N, which constitutes a knife, cuts off the wire. This piece of wire is held in position by the spring clips 112. The tool continues its movement downward until it is in delivery position shown in Fig. 12, that is, until the severed wire is in alignment with the inserter R. The inserter R then advances to eject the wire from the portion 116 of the cut-off tool and insert the same into the drilled holes of the collars, and, while the wire is being inserted into these holes, the portion 117 of the cut-off tool and the portions of the clips associated therewith prevent the wire from dropping out of line with the drilled holes in the collar 8 of the pinion. After the wire has been thus inserted, the inserter is retracted, and the cut-off tool is moved up to the receiving position. As the tool is thus moved upwardly, the clips 112 are cammed apart by the inserted wire and thus released therefrom.

Figure 3:
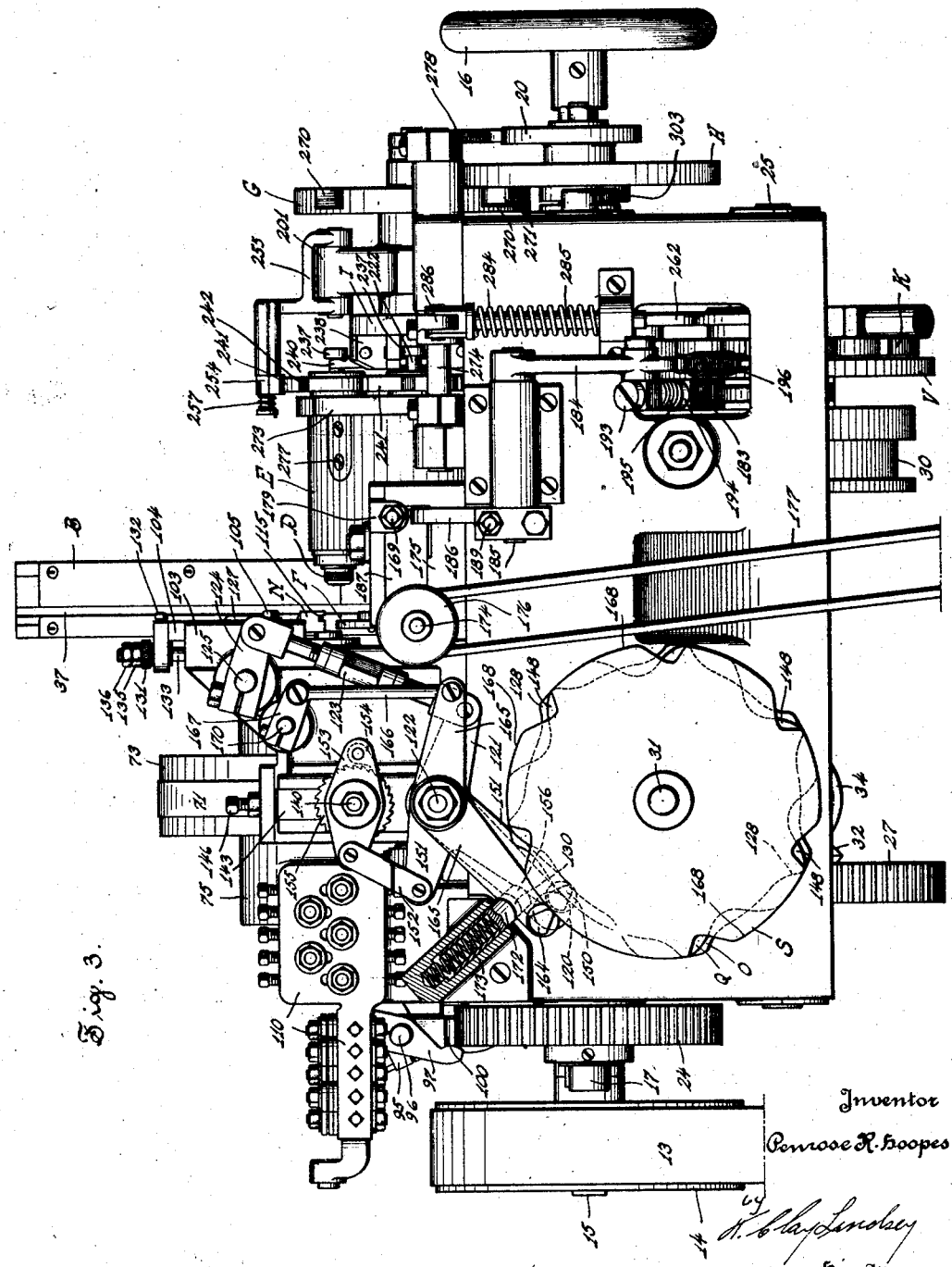
Fig. 3 is a front view of the upper portion of the machine.

The cut-off tool N is controlled in its reciprocating movements by the cut-off cam O in the following manner. Riding on the periphery of this cam (see Fig. 3) is a follower 120 carried by a bell crank 121 pivoted on the stud 122 and connected by a link having a turn buckle 123 to an arm 124 carried by a shaft 125 journalled adjacent the upper end of the bracket 103. On the rear of this shaft 125 (see Fig. 11) is an operating arm 126 the end of which rotatably engages in a shoe 127 slidably carried by the slide 104. The arrangement is such that the cut-off tool is positively lowered by the cam O through the arrangements described, and the cut-off tool is raised by means of a spring pressed plunger 130 which engages the bell crank 121 in such manner as to maintain the follower 120 in engagement with the cut-off cam O. The spring pressed plunger 130 is similar to the spring pressed plunger 172, which will be described hereinafter more in detail. The cut off cam O has six lobes 128 so arranged that between each indexing movement of a collet D at filling position, the cut-off tool is moved from the receiving position shown in Fig. 11 to the delivery position shown in Fig. 12, and then back again to receiving position, there being a slight dwell of the tool at receiving position so as to permit the wire to be delivered thereto and there being a slight dwell at delivery position so as to permit the wire to be ejected therefrom. That portion of the cam with which the follower 120 engages, as shown in Fig. 3, is of sufficient length to permit the cut-off tool being held in its uppermost position during the indexing movement of the turret.

In order that the cut-off tool may be adjusted so as to bring the wire receiving groove 111 thereof into proper alignment with the wire opening 107 and the inserter R, the following arrangements are provided. Carried by the upper end of the slide 104 is an adjustable nut 131 which may be held in adjusted position by a set screw 132. Thus nut 131 slides on a stem 133 screwed into the upper end of the bracket 103 and carrying a collar 134 against which the lower end of the nut 131 is adapted to engage to limit the downward movement of the slide 104 and the cut-off tool carried thereby. Screwed onto the upper end of the stem 133 is a nut 135 against which the upper end of the nut 131 is adapted to engage so as to limit the upward movement of the cut-off tool under the influence of the spring pressed plunger 130. To adjust the slide 104 so that the cut-off tool is in proper alignment with the inserter R, when the tool is in the delivery position shown in Fig. 12, the nut 131 is turned while the lower end of this nut is in engagement with the collar 134 of the stem 133. Then, with the parts in this position, the turn buckle 123 is adjusted while the follower 120 is in engagement with the high point of one of the lobes 128 of the cam O. After this adjustment is made, the slide 104 is raised to engage the nut 131 with the nut 135 and the latter is turned until the groove 111 of the cut-off tool is in accurate alignment with the opening 107 in the quill 106. The nut 135 is then locked in position by the nut 136.

Referring now to the feed rolls P, the lower roll, as shown most clearly in Figs. 1 and 9, is fixed to a shaft 140 journalled in the bracket 103. The upper roll is journalled on a stud 142 extending rearwardly from an adjustable member 143 pivoted as at 144. The rolls P are connected by gears 145 so as to rotate in opposite directions. The upper roll is adjusted relative to the lower one by means of a set screw 146 engaging the member 143 so that the wire passing between the rolls will be properly gripped. The member 143 may be urged against the screw 146 by a spring 147.

The feed rolls P are intermittently rotated by the wire feed cam Q fixed to the forwardly projecting end of the shaft 31. Riding on the periphery of this cam Q (see Fig. 3) is a follower 150 carried by a bell crank 151 pivoted on the stud 122 and connected by means of a link 152 to a lever 153. This lever is pivoted on the shaft 140 and carries a pawl 154 cooperating with a ratchet 155 fixed to the shaft 140. The cam Q positively rotates the feed rolls in a direction to feed the wire to the cut-off tool. The pawl 154 is moved on its inoperative stroke by a spring pressed plunger 156 which engages the bell crank 151 and maintains the follower 150 against the periphery of the cam Q. The cam Q has six lobes 148 so arranged that, while the cut-off tool is in the receiving position shown in Fig. 11, the feed rolls are caused to deliver the wire to the proper length to the cut-off tool and, while the cut-off tool is delivering the wire to delivery position, the feed rolls are inoperative. While the severed wire is being ejected from the cut-off tool, and while the cut-off tool is returning, the cam Q permits the spring pressed plunger 156 to move the pawl 154 on its inoperative stroke. Also, while the collet at filling position is being indexed the feed rolls are inoperative and while the turret is being indexed, the feed rolls are inoperative for a longer length of time.

The inserter R, as most clearly shown in Fig. 11, has a pin 160 fixed to a plunger 161 mounted in a counterbore 162 in the quill 106. Within the counterbore is a spring 163 which normally urges the inserter to the retracted position shown in Fig. 11. The inserter R is controlled in its movements by the cam S fixed to the forward end of the transverse shaft 31. Engaging the periphery of this cam is a follower 164 carried by a bell crank 165 pivoted on the stud 122 and connected by a link 166 to an arm 167 fixed to the forward end of a shaft 170 journalled in the bracket 103 adjacent the shaft 125. On the rear end of this shaft 170 is an operating arm 171 which engages the end of the plunger 161 of the inserter R. Pressing against the bell crank 165, in such manner as to maintain the follower 164 against the cam S, is a plunger 172 behind which is a spring 173 (see Fig. 3). The arrangement is such that the inserter R is resiliently moved by the spring 173 in a direction to eject the severed wire from the cut-off tool and insert it into the drilled pinion blank, and the operating arm 171 is positively withdrawn, that is moved to the left, referring to Fig. 11, by the cam S so as to permit the spring 163 to retract the inserter to the position shown in Fig. 11. This arrangement is of advantage in that, if the drilled pinion is not in condition to receive the cut-off wire, no damage will result. The cam S has six lobes 168, and these lobes are so arranged that the spring pressed plunger 172 may quickly move the inserter to eject the cut-off wire from the cut-off tool while the latter is remaining stationary at delivery position, and the inserter is retracted while the cut-off tool is moving upwardly. During the indexing movements of the spindle at filling position and the delivery movements of the cut-off tool, the inserter remains in retracted position.

The knurling mechanism will now be described, particular reference being had to Figs. 14 and 15. On the top of the bed A and forwardly of the dead center plate F is a knurling tool T mounted for rotation at right angles to the axis of the turret. This tool is carried by a shaft 174 journalled in a bracket 175 and carrying on its forward end a grooved pulley 176 constantly driven by a belt 177 passing about a grooved pulley 178 fixed to the main shaft 10. The bracket 175 has a cover plate 179 shown in Fig. 1 and omitted in Fig. 14. Mounted for sliding movement in suitable ways on the rear face of the bracket 175 and on a line in substantial parallelism with the axis of the collet at knurling position is a slide 180. Journalled in this slide is a stud 181 carrying the gear U which is adapted to mesh with the leaves of the pinion. This gear is also adapted to be urged against the collar 7 of the pinion so as to hold the face of this collar against the constantly rotating knurling tool T.

The slide 180, together with the gear U, is controlled in its movements by the cam V which is fixed to the lower cam shaft 25. As shown in Fig. 4, riding on the periphery of this cam is a follower 182 carried by a fork 183 to the forward end of which is connected an arm 184. This arm is fixed to a shaft 185 which carries on its left hand end an operating arm 186, the free end of which engages a bell crank 187 pivoted as at 190 in the bracket 175. One end of this arm engages in a shoe 191 carried by the slide 180. The bell crank is urged into engagement with the operating arm 186 by a spring pressed plunger 192. The extent to which the gear U may be moved towards the knurling tool may be adjustably limited by a screw 189 carried by the arm 186 and adapted to engage the bracket 175. The extent to which the plunger can move the slide is adjustably limited by the screw 169 carried by the cover plate 179. There is an adjustable resilient connection between the fork 183 and the arm 184 in order that the collar 7 on the pinion may be resiliently urged against the knurling tool, and thus permit the knurling tool to gradually bite into the collar without jamming the parts. This connection includes an adjustable screw 193 passing through an opening in the arm 184 and screwed into the fork 183. The screw may be locked in adjusted position by a nut 194. Between the nut and the arm is a spring 195. For the purpose of causing the follower 182 to remain in engagement with the periphery of the cam V, a tension spring 196 is connected at its respective ends to the free end of the arm 184 and the bed of the machine. The cam V is concentric for the major portion of its periphery and, while the follower is riding on this portion, the gear U maintains the collar 7 of the pinion against the knurling tool. The cam has a single low portion 197 and, while the follower is riding on this portion, the gear is in its remote position from the knurling tool and, during this time, the turret is indexed to bring a filled pinion to knurling position and to move the previously knurled pinion away from knurling position. The portion 198 of the cam V causes the gear U to engage the collar 7 and move it against the knurling tool, and when the follower 182 engages the cam portion 199, the gear U is withdrawn. As hereinafter described more in detail, as the pinion is being brought to knurling position, the collet engaging that pinion is partly released therefrom but is not withdrawn entirely so that the pinion, under the influence of the rotating knurling tool, may rotate in the bearings provided by the collet and the dead center plate.

The carrier for the pinions will now be described, particular reference being had to Figs. 4, 5, 7 and 8. This carrier, as previously stated, includes the turret E and the dead center plate F. These elements are mounted on, so as to be indexed with, a shaft 200 journalled in suitable bearings in the brackets 103 and 201 arising from the top of the bed A. The dead center plate F is in the form of a ring connected to a hub 203 which is keyed to the shaft by keys 204. By preference, the hub is adjustable longitudinally of the shaft 200, and to this end the nuts 205 may be provided. The dead center plate has centers corresponding in number to, and respectively aligned with, the collets, in the present instance four such centers in the form of holes 206 being provided at 90° apart. These centers go all the way through the plate and are positioned adjacent the periphery of the plate so that the pinion collars will extend beyond the periphery and thus accommodate the drilling and filling operations. Within each of the center holes 206 is a pin 207 adapted to engage and press against the end of the pinion staff. These pins have heads 210 engaging in grooves 211 on the rear face of the plate, and pressing against these heads are leaf springs 212.

The turret E has a head or body 213 provided with four bores in each of which a collet mechanism is mounted. As shown most clearly in Fig. 7, each bore has a lining 214 in which is journalled against longitudinal movement a collet indexing sleeve 215 having, between its ends, an internal shoulder 216. Slidably mounted in, and keyed to so as to rotate with, the sleeve 215 is a collet pull back sleeve 217 on the forward end of which is screwed the collet closer 220. Adjacent the rear end of the pull back sleeve 217 is a shoulder 221 adapted to engage the shoulder 216 to limit the forward movement of the collet mechanism, as hereinafter described more in detail. Within the pull back sleeve 217 is a draw bar or pull back rod 222 to which is screwed the spring collet member 223 which, as usual, has a plurality of spring fingers adapted to be contracted against the work. The forward end of the collet member is tapered as at 224 and the closing member 220 is similarly tapered so as to spring the fingers towards each other and thereby chuck the work. Slidably mounted within the collet member 223 is an ejector in the form of a pin 225 behind which is a spring 226. The draw bar 222 has limited sliding movement relative to the pull back sleeve 217 and is keyed to this sleeve by the key 227. In the present instance, this key is carried by the rod 222 and has sliding movement in slots 230 in the pull back sleeve 217 and in slots 231 in the index sleeve 215, the slots 230 being shorter than the slots 231. The pull back rod 222 has a shoulder 232 against which engages a washer 233 between which and the rear end of the pull back sleeve is a spring 234 which causes the pull back sleeve to follow the forward movement of the pull back rod until the shoulder 221 on the sleeve engages the shoulder 216 on the index sleeve 215. Between the washer 233 and a nut 235 is a collet closing spring 236. The nut 235 closes the rear or right hand end of the index sleeve 215. On the right hand end of each draw bar is a button or head 237 with which cooperates a pivoted bell crank 240 which is operated by the cam I which, in turn, is controlled by the cam H.

The operation of the collet mechanism just described may now be explained in detail. During the indexing movement of the turret, the collet mechanism which is being brought to drilling position is in the condition shown in Fig. 7 and, in this condition, the cam I, through the bell crank 240, has pulled back the rod 222, and the key 227 is holding the pull back sleeve 217 in retracted position, that is with the shoulder 221 spaced from the shoulder 216. Assuming now that the turret has been indexed and a blank has been delivered by the slide C to a position where it can be chucked, the cam I is rotated to permit the draw bar to be advanced by the collet closing spring 236. Owing to the spring 234, the pull back sleeve 217 will advance with the pull back rod until the shoulder 221 engages the shoulder 216 so that the closing sleeve 230 will not act upon the collet member 223 until the closing sleeve has been advanced to its foremost position shown in Fig. 8. After the shoulder 221 has engaged the shoulder 216, the closing spring 236 continues to advance the draw bar 222 and the collet member 223 carried thereby, with the result that the now stationary closing member 220 will contract the spring fingers of the collet member causing them to grip the pivot 4 of the shaft 2 of the pinion blank.

It is of importance to observe that, when the collet member 223 is advanced to chucking position, the forward ends of its fingers engage against the shoulder 6 on the pinion shaft and slides the pinion on the feed slide C so as to engage the pivot 3 on the other end of the pinion shaft in the center 206. The leaf spring 212 on the plate F is slightly stronger than the spring 226 so that the pivot 4 of the pinion will enter between the spring fingers of the collet member and push back the ejector plunger 225. It will be seen from Fig. 8, there is a clearance between the dead center plate and the shoulder 5 on the pinion shaft. Thus, the collet determines the longitudinal position of the pinion with respect to the drilling and filling mechanisms so that the drill will enter the second collar 8 of the pinion to the desired extent without passing through it and the wires will be fed to the proper depth into the drilled holes. The collet member remains chucked to the pinion during the drilling operation and the filling operation and, as hereinafter described more in detail, is partially released from the pinion at knurling position and is then entirely withdrawn from the pinion as the collet is indexed from knurling position. In releasing and withdrawing the chuck from the pinion, the bell crank 240 moves the draw bar to the right, referring to Figs. 7 and 8, and the draw bar will move independently of the pull back sleeve 217 until the key 227 engages the right hand ends of the slots 230. During this time, the spring 234 is maintaining the pull back sleeve 217 advanced, that is with the shoulder 221 engaging the shoulder 216. After the key 227 engages the right hand ends of the slots 230, the draw bar and the pull back sleeve are retracted in unison so as to entirely withdraw the collet mechanism from the pinion.

The means for indexing the collets about their own axes at drilling and filling positions will now be described. On the right hand end of each index sleeve 215 is a ratchet wheel 241 having, on its periphery, teeth 242 corresponding in number and spacing to the number of leaves with which the pinions are to be provided, in the present instance six such teeth, spaced apart at 60°, being illustrated. In the left hand face of each ratchet wheel 241 are, as most clearly shown in Fig. 7, tapered recesses 243 corresponding in position and number to the teeth 242. Associated with each ratchet wheel is a plunger 244 behind which is a spring 245, the end of the plunger being tapered correspondingly to and adapted to engage in the recesses 243. These plungers are carried by the turret head 213. The collets are indexed through the ratchet wheels 241 but they are accurately located and held in indexed positions by the engagement of the plungers in the recesses, and this is of advantage in that slight inaccuracies in the indexing mechanism or wear on the parts will not effect accurate indexing of the collets at drilling and filling positions. Pivoted on a pin 246 carried by the bracket 201 is a lever 247 which carries a pawl 250 adapted to cooperate with the ratchet wheels when the latter are at drilling position. In the present instance, the pin 246 is in axial alignment with a collet when the latter is at drilling position and one end of the lever 247 straddles the upper end of the bracket 201 and is pivoted on this pin. The other end of the lever has an extension on the end of which the pawl 250 is pivoted. The pawl is normally urged in a direction to engage the periphery of a ratchet wheel by a spring 252, and the extent to which the pawl can move under the influence of this spring is limited by a pin 253.

The pawl 254 which cooperates with the ratchet wheel of a collet mechanism, when the latter is at filling position, is carried by a lever 255 which is similar to the lever 247. The lever 255 is pivoted on a pin 256, and this pin is in axial alignment with the filling position of the collet mechanisms. The spring 257 and pin 258 associated with the pawl 254 are respectively similar to the spring 252 and pin 253. The levers 247 and 255 are connected by a link 260 so that identical indexing movements of the collets at drilling and filling positions are simultaneously effected. The indexing movements of the collets at these positions are controlled by the cam K which is fixed to the shaft 25 within the bed of the machine. As will be seen most clearly from Fig. 4, riding on the periphery of this cam is a follower in the form of a roller 261 carried by a fork 262 pivotally connected at its upper end, as at 263, to the pawl carrying lever 247. The lower end of the fork 262 slidably straddles a block 264 pivoted on the shaft 25. Between this block and the lower end of the fork are springs 265 which maintain the follower 261 in engagement with the periphery of the cam K. While each collet has six indexed positions when at the drilling station and the filling station, the cam K is provided with but five lobes for the reason that a sixth lobe is unnecessary since the collets are brought in proper indexed relation to the drilling and filling stations upon the completion of the indexing motion of the turret. The cam K rotates in the direction of the arrow, Fig. 4, and while the follower is riding on the relatively long concentric and low cam surface 266, the turret is indexed and the first pair of holes are drilled in the pinion collars at drilling position and one set of holes is filled with a wire at filling position. When the cam surface 267 of a lobe engages the follower, the collets at drilling and filling positions are indexed one step and, when a cam surface 268 of a lobe engages the follower, the springs 265 move the levers 247 and 255 on their inoperative strokes and to the position shown in Fig. 4. Between the lobes are concentric portions 269 on which the roller 261 rides during the operations of drilling and filling the pinion.

The means for indexing the turret will now be described. On the right hand end of the carrier shaft 200 is fixed the Geneva index plate G which has four radial slots 270. Fixed to the collet controlling cam H is a roller 271 which constitutes the driving member of the Geneva motion device in that it cooperates with the plate G in a manner to index the same. The cam H is fixed to the reciprocating shaft 17 which makes one revolution while the shaft 25 is making four revolutions. Should the driving member 271 of the Geneva motion device be revolved in the ratio of one to one to the operating cams for the drilling and filling mechanisms, one-quarter of the time required for a complete cycle of the machine would be wasted in indexing the turret. In order to avoid this waste of time, the arrangement is such that the turret is quickly indexed so that it requires but a small portion of the cycle, leaving the remainder of the time free to effect the various other operations. To this end, the shaft 17 is rotated four times as fast as the cam shafts 25 and 31, and the shaft 17 is reciprocated so that only upon a portion of every fourth revolution of this shaft is indexing movement of the turret effected. Assuming that one cycle of the machine consists in bringing a pinion to drilling position and completing all of the drilling operations thereon and during this time the cam shafts 25 and 31 make one complete revolution, but one-sixteenth of a cycle is employed in indexing the turret. The shaft 17 is reciprocated in proper timed relation to the other parts by the cam 30 fixed to the shaft 25 and cooperating with a shipper lever 272, the construction of which is most clearly shown in Figs. 4 and 5. The cam 30 is so constructed that for three complete revolutions of the reciprocating shaft 17, the cam H carrying the roller 271 is in the dotted line position shown in Fig. 5 and, during the fourth revolution, the roller 271 is moved towards the index plate G, effects indexing movement thereof, and then moves away from the plate G.

In order to insure that the turret is accurately brought and maintained in indexed positions, means, automatically controlled in timed relation to the indexing movements of the turret, is provided for locking the turret in indexed positions. This locking means (see Figs. 2 and 4) includes a lever 273 fixed to the shaft 274 and having a wedge-shaped end 275 adapted to engage in tapered notches 276 provided in blocks 277 carried by the turret. The notches 276 are spaced apart 90°. The end 275 of the lever has a wedging fit in each notch so as to accurately bring the turret into proper indexed position and hold it in that position. The lever is controlled by the cam 20 fixed to the right hand end of the reciprocating shaft 17. Engaging the periphery of this cam is the free end of a lever 278 fixed to the right hand end of the pin or shaft 274. The cam 20 has a portion 280 for disengaging the locking lever from the turret just before the roller 271 indexes the turret; a concentric portion 281 for holding the lever in the unlocked position shown in Figs. 2 and 4 during the indexing movement of the turret; a portion 282 for permitting the locking lever to move into engagement with the turret to lock the same in position after it has been indexed; and an ineffective concentric portion 283 of small radius so that the cam may move to a position beneath the free end of the lever 278 when the shaft 17 is moved in a direction to engage the Geneva motion device. The locking lever is normally urged into locking position, and the lever 278 is urged in a direction to engage it with the cam 20 by a spring 284 about the plunger 285, the upper end of which is connected to an arm 286 which, in turn, is fixed to the shaft 274. The cam 20, as stated, is fixed to the shaft 17 so that it is in proper timed relation to the driving member or roller 271 of the Geneva motion device.

Reference will now be had to the cam I for operating the collets to chuck and release the work, and the cam H which controls the cam I. The cam I has in its face a cam groove against the outer periphery of which the bell cranks 240, associated with the draw back rods 222, are engaged. This cam is mounted for oscillating movement on the end of a sleeve 290 (see Fig. 5). It has, as shown most clearly in Fig. 4, a cam surface 291 for controlling the chucking of the collet at drilling position, an ineffective portion 292; a portion 293 for partially releasing a collet from the work as the same is being brought to knurling position; a portion 294 for holding the collet at knurling position in partially retracted condition; a portion 295 for completing the retraction of the collet as the same is moved from knurling position, thereby resulting in ejection of the work; and a portion 296 for maintaining the collet in retracted position after the work has been released therefrom and until it is again brought to drilling position.

Connected to the cam I is a link 300 pivoted to an arm 301 fixed on a shaft 302 which also carries an arm 303 having a roller 304 which engages in the cam groove of the cam H. The cam I is normally urged to the position shown in Fig. 4 by a spring 305. The cam groove of the cam H has a portion 306 (see Fig. 2) which, when the roller 304 is engaged therein, causes a limited rotary movement of the cam I in the direction in which the turret is indexed and during the initial indexing movement of the turret; that is, the cam I is brought to the position shown in Fig. 4ª. The cam groove of the cam H also has a portion 307 which, when the roller 304 engages therein, rotates the cam I in a direction opposite to that in which the turret is indexed and to the position shown in Fig. 4, but before this has taken place, the indexing movement of the turret has been completed. Between the portions 306 and 307 is a portion 308 which momentarily holds the cam I in the position shown in Fig. 4ª. The portion 309 of the cam groove is ineffective and is of sufficient width to permit the roller 304 to engage in the cam groove when the shaft 17 is moved to the left to engage in the Geneva motion device. When the cam H is in the withdrawn position shown in Fig. 5, the roller 304 rides on the hub 310 of the cam so that the cam I is held in normal position while the cam H is inoperative and the roller will properly ride into the cam groove when the shaft 17 is moved to the left. With the arrangement just described, it will be understood that the cam H, since it is mounted on the reciprocating shaft 17 and carries the driving member 271 of the Geneva motion device, operates in proper timed relation to the indexing movement of the turret and the locking lever 273. As the turret starts to index, the cam portion 306 of the cam H receives the roller 304 with the result that for a limited movement of the turret, the cam I will move in unison therewith so as to bring this cam to the position shown in Fig. 4ª and in which position it remains until the turret is fully indexed so as to hold the collet being brought to drilling position retracted. After the turret has been brought to full indexed position and a pinion blank has been fed to drilling position, the cam portion 307 of the cam H is effective to move the cam I back to the position shown in Fig. 4 and, while the cam I is so moved, that bell crank 240 associated with the collet which has been brought to drilling position rides down the cam surface 291 of the cam I thus permitting the draw bar 222 to advance and the collet to chuck the pinion. As a collet is being moved from drilling position to filling position, the cam I has no effect thereon. While a collet is being moved from filling to knurling position, the cam portion 293 of the cam I partially retracts the draw bar associated with that collet so as to partly unchuck the work. The cam portion 294 maintains the collet partially retracted at knurling position so that the collet forms a bearing for the pinion during the knurling operation. As the collet initially moves away from knurling position, the cam I, as previously stated, is moved with the turret so that the pinion is not entirely released from the collet by the cam portion 295 until the collet has been moved a limited extent from knurling position. This collet is maintained in retracted position by the surface 296 until the collet has again been brought to drilling position.

The general operation of the machine will now be briefly described. Assuming that the drilling, filling and knurling operations have been completed at the respective stations, the turret is indexed by the Geneva motion device, the cam 30 having moved the shaft 17 to the left to engage the parts of that device. Just before the indexing movement of the turret is effected, the cam 20 raises the turret locking lever 273. During the indexing movement of the turret, the feed slide C is moving a blank to drilling position. Also, during the indexing movement of the turret, the collet controlling cam H, acting through the collet operating cam I, holds that collet which is being brought to drilling position retracted, as shown in Fig. 7, so that the collet will clear the pinion blank which is being brought to drilling position. It will be understood, of course, that the collet, which is brought to drilling position upon indexing movement of the turret, is in proper indexed position with respect to its own axis, it being held in such position by the plunger 244 engaging in a recess 243 of the ratchet 241. Also that collet which has been at drilling position and is brought to filling position, will be brought in the proper indexed condition to this latter position with the set of holes last drilled in alignment with the inserter R. That collet which is being brought to knurling position is partially released from the work by the cam I, as previously described, and that collet which is moving away from knurling position is completely withdrawn so as to entirely release the work which may fall into a suitable chute or receptacle, not shown. As the turret completes its indexing movement, the locking lever 273 is moved into operative position so as to engage in one of the notches 276 and thereby locate and hold the turret in indexed positon. After the turret has been indexed, the cam I will be rotated clockwise from the position shown in Fig. 4ª to that shown in Fig. 4 with the result that the collet at drilling position is moved by the closing spring 236 so as to chuck the pinion which is now being held stationary on the feed slide C in drilling position, whereupon the feed slide will be withdrawn to receive another pinion from the magazine and the drill will be moved by the cam M to drill one set of holes in the blank. Also, immediately after the turret is indexed, the feed rollers P are operated by the cam Q to feed the wire to the cut-off tool, whereupon the cut-off cam O lowers the cut-off tool so as to cut off the wire delivered thereto and carry it into alignment with the inserter R which is immediately allowed to move forward by the cam S to feed the wire to the drilled pinion at filling position, the cut-off tool remaining momentarily stationary at delivery position while the inserter is operating. Also, after the turret is indexed, the cam V moves the backing gear U against the collar 7 of the pinion at knurling position to move it against the knurling tool T. The drill, having drilled one set of holes, is now withdrawn and, by the time it reaches its full retracted position, the wire feed cam Q will have resulted in moving the pawl lever 153 on its inoperative stroke, the cut-off tool will have been raised to receiving position, and the inserter will have been retracted. Then the spindles at drilling and filling positions are indexed 60° by the index cam K and, during this time, the drill, the cut-off tool and the inserter R remain stationary in the positions which they have last assumed and the rolls P feed another length of wire to the cut-off tool. The drill now drills another set of holes in the pinion at drilling position while a second set of holes is being filled at filling position. These operations are repeated until all of the holes have been drilled in the pinion at the first station and all the holes in the pinion at the second station have been filled. As the last sets of holes are being drilled and filled in the pinions at the respective positions, the gear U of the knurling mechanism is withdrawn preparatory to indexing the turret and, before the turret is indexed, the locking lever is again raised out of engagement therewith. The cycle is then repeated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a machine of the character described, a plurality of stations, a rotary indexible carrier adapted to support and carry pinion blanks from one station to another, means for indexing said carrier, means at one station for drilling a plurality of holes in the pinion blanks, and means at a later station for filling the drilled blanks with wires.

2. In a machine of the character described, an indexible carrier for moving pinion blanks from a drilling station to a filling station, means for indexing said carrier, means for indexing the pinion blanks about their own axes at each of said stations, a drill at said drilling station, means at the filling station for filling the drilled pinion blanks with wires, means for reciprocating said drill each time a pinion blank is indexed at the drilling station, and means for operating said filling means each time a blank is indexed at the filling station.

3. In a machine of the character described, a rotary indexible carrier for supporting and carrying pinion blanks from a drilling station to a filling station, means for delivering pinion blanks to the drilling station, means for indexing said carrier, means for indexing said pinion blanks about their own axes at each of said stations, means for drilling the pinion blanks at the drilling station, and means for filling the pinion blanks at filling station.

4. In a machine of the character described, drilling and filling stations, a rotary indexible carrier having a plurality of angularly spaced chucking mechanisms for holding the pinion blanks, means for indexing said carrier to move said mechanisms in sequence from one station to another, means at one station for drilling the pinion blanks, means at another station for filling the pinion blanks with wires and indexing means for said chucks.

5. In a machine of the character described, an indexible carrier having angularly spaced apart collet mechanisms for chucking pinion blanks, means for indexing said carrier to move said mechanisms in sequence from a drilling station to a filling station, means for indexing said collet mechanisms at each of said stations, a drill at the drilling station, means for reciprocating said drill each time a pinion blank is indexed at the drilling station, means at the filling station for filling the drilled blanks with wires, and means for operating said filling means each time a blank is indexed at said filling station.

6. In a machine of the character described, a rotary indexible carrier having a plurality of angularly spaced apart collet mechanisms adapted to support pinion blanks, means for indexing said carrier to move said mechanisms in sequence from a drilling station to a filling station, means at the drilling station for drilling the pinion blanks, means at the filling station for filling the drilled pinion blanks, and means for indexing said collet mechanisms at said drilling station and said filling station and including ratchets respectively associated with said collet mechanisms and a cam for controlling said ratchets.

7. In a machine of the character described, an indexible carrier having a collet mechanism for holding pinion blanks, means for indexing said carrier to move the collet mechanism from one station to another, means at the various stations for drilling and filling the pinion blanks, means for indexing said mechanism at each of said stations, and means for operating said collet mechanism to engage the same with pinion blanks delivered thereto.

8. In a machine of the character described, a rotatable indexible carrier having a plurality of angularly spaced apart collet mechanisms for supporting pinion blanks, means for indexing said carrier to move said mechanisms in sequence from one station to another, means at one station for drilling a plurality of holes in the pinion blanks, means at another station for filling the pinion blanks, and means for operating said collet mechanisms to engage them with pinion blanks supplied thereto and to release the pinion blanks after they are operated upon.

9. In a machine of the character described, a rotatable indexible carrier having a plurality of collet mechanisms, means for indexing said carrier to move said collet mechanisms in sequence from a drilling station to a filling station, means for indexing said collet mechanisms at each of said stations, means for feeding a pinion blank to the drilling station each time said carrier is indexed, means at the drilling station for drilling the pinion blanks, means at the filling station for filling the pinion blanks with wires, and means for operating said collet mechanisms to engage the same with the pinion blanks delivered to the drilling station.

10. In a machine of the character described, an indexible carrier having a plurality of angularly spaced apart pairs of aligned centers between which pinion blanks are adapted to be supported, one center of each pair being dead and the other being a chucking member, means for indexing said carrier to move said chucking members in sequence to successive stations, drilling means at one of said stations, means at another of said stations for filling the drilled pinion blanks, means for delivering pinion blanks to one of said stations, and means for operating the chucking member at the last mentioned station to engage it with the pinion blank delivered thereto.

11. In a machine of the character described, a rotary indexible carrier having a plurality of collet mechanisms for support-pinion blanks, means for indexing said carrier to move said mechanisms in sequence from a drilling station to a filling station, means for indexing said collet mechanisms about their own axes at each of said stations, means for feeding pinion blanks one by one to the drilling station, means at the drilling station for drilling the pinion blanks, means at the filling station for filling the drilled pinion blanks, means for operating the collet mechanisms to engage the same with the pinion blanks and to release them from said blanks, and means for operating all of said means in timed relation.

12. In a machine of the character described, an indexible carrier provided with a plurality of collet mechanisms for supporting pinion blanks, means for indexing said carrier to move said mechanisms in sequence from a drilling station to a filling station, means for indexing said mechanisms about their own axes at each of said stations, means at the drilling station for drilling holes one by one in each pinion blank, means at the filling station for delivering wire lengths into alignment with the drilled holes of the pinion blanks, and means for inserting the wire lengths thus delivered.

13. In a machine of the character described, a rotary indexible carrier having a plurality of collet mechanisms for supporting pinion blanks, means for indexing said carrier to move said collet mechanisms in sequence from a drilling station to a filling station, means for indexing said collet mechanisms at each of said stations, a drill at the drilling station, means for reciprocating said drill each time a collet mechanism at the drilling station is indexed, and means at the filling station for severing, delivering and inserting a wire to a drilled pinion blank each time the latter is indexed.

14. In a machine of the character described, a rotary indexible carrier having a plurality of collet mechanisms for supporting pinion blanks, means for indexing said carrier to move said collet mechanisms in sequence from a drilling station to a filling station, means for indexing said collet mechanisms at each of said stations, a drill at the drilling station, means for reciprocating said drill each time a collet mechanism at the drilling station is indexed, means at the filling station for severing, delivering and inserting a wire to a drilled pinion blank each time the latter is indexed, and means for operating all of said means in timed relation.

15. In a machine of the character described, an indexible carrier having a plurality of collet mechanisms adapted to support pinion blanks, means for indexing said carrier to move said mechanisms in sequence from a drilling station to a filling station, means for indexing said collet mechanisms at each of said stations, means for feeding pinion blanks one by one to the drilling station, means at the drilling station for drilling holes one by one in the pinion blanks, means at the filling station for supplying and inserting wires one by one in the drilled pinion blanks, and means for operating said collet mechanisms to grip and release the pinion blanks.

16. In a machine of the character described, a rotary indexible carrier adapted to support and carry pinion blanks from one station to another, means for indexing said carrier, means at the various stations for drilling the pinion blanks, filling them with wires and fastening the wires in place, and means for indexing said pinion blanks about their own axes at the drilling station and the filling station.

17. In a machine of the character described, an indexible carrier having a plurality of collet mechanisms, means for indexing said carrier to bring said mechanisms from one station to another, means at one of said stations for drilling holes in the pinion blanks, means at another station for filling the pinion blanks with wires, means at another station for knurling the pinion blanks, and means for indexing said mechanisms about their own axes at the drilling station and the filling station.

18. In a machine of the character described, an indexible carrier provided with collet mechanisms, means for indexing said carrier to move said mechanisms to successive stations, means at one of said stations for drilling the pinion blanks, means at another station for filling the pinion blanks with wires, a knurling tool at another station for fastening the wires in place, and means for operating said collet mechanisms to partially release the pinions therefrom at the knurling station and to totally withdraw the collet mechanisms after the knurling operations have been completed.

19. In a machine of the character described, a rotary indexible carrier provided with a plurality of collets adapted to support pinion blanks, means for indexing said carrier to move said collets to successive stations, means at one of said stations for drilling the pinion blanks, means at another station for filling the blanks with wires, means at another station for knurling the pinions, means for feeding pinion blanks to the drilling station, and means for operating the collets to engage them with the pinions at the drilling station and to partially disengage them from the collets at the knurling station and then totally withdraw the collets after the knurling operation.

20. In a machine of the character described, a rotary indexible carrier provided with a plurality of collets adapted to support pinion blanks, means for indexing said carrier to move said collets to successive stations, means at one of said stations for drilling the pinion blanks, means at another of said stations for filling the drilled blanks with wires, a knurling tool at another station, means for indexing the pinion blanks at the drilling station and the filling station, means at the knurling station for engaging the pinion blanks and holding the same against the knurling tool, and means for operating said mentioned means in timed relation.

21. In a machine of the character described, a carrier for pinion blanks and provided with a plurality of pairs of centers, one center of each pair comprising a collet and the other center being a recess in which the staffs of the pinion blanks are adapted to engage, means for indexing said carrier to move the pairs of centers to successive stations, drilling means at one of said stations, means at another of said stations for filling the drilled pinion blanks with wires, means at another station for knurling the pinions to fasten the wires in place, means at the knurling station for moving the pinion blanks against the knurling means, and means for operating said collets as the same are being brought to the knurling station so as to partially release the collets from the pinions and to entirely withdraw the collets from the pinions as the collets are moved away from the drilling station.

22. In a machine of the character described, an indexible carrier for moving pinion blanks from a drilling station to a filling station, means for indexing said carrier, means for indexing the pinion blanks about their own axes at each of said stations, a drill at said drilling station, means at the filling station for filling the drilled pinion blanks with wires, means for reciprocating said drill each time a pinion blank is indexed at the drilling station, means for operating said filling means each time a blank is indexed at the filling station, and means for locating and locking said carrier in indexed positions.

23. In a machine of the character described, a rotary indexible carrier having a plurality of angularly spaced collets adapted to support pinion blanks, means for indexing said carrier to move said collets in sequence from a drilling station to a filling station, means for positioning and locking said carrier in indexed positions, means for indexing said collets about their own axes at each of said stations, means at the drilling station for drilling the pinion blanks, and means at the filling station for filling the blanks with wires.

24. In a machine of the character described, a rotary indexible carrier having a plurality of angularly spaced apart collets adapted to support pinion blanks, means for indexing said carrier to move said collets in sequence from one station to another, means at one station for drilling the pinion blanks, means at another station for filling the pinion blanks with wires, means for indexing said collets at the drilling station and the filling station; said carrier indexing means comprising a Geneva motion device having a driven member connected to the carrier and a driving member driven in timed relation to said collet indexing means, drilling means and filling means; and means for periodically moving the driving member out of operative relation to the driven member for the purpose described.

25. In a machine of the character described, a rotary indexible carrier provided with a plurality of collets adapted to support pinion blanks, means including a Geneva motion device for indexing said carrier to move said collets to successive stations, means at one of said stations for drilling the pinion blanks, means at another station for filling the pinion blanks with wires, cams for controlling the drilling means and the filling means, a shaft driven in timed relation to said cams, the driving member of the Geneva motion device being carried by said shaft, means for operating said collets, a cam carried by said shaft for controlling said collet operating means, and means for reciprocating said shaft to render the Geneva motion device and the collet controlling cam inoperative on certain rotations of the shaft.

26. In a machine of the character described, an indexible carrier provided with a plurality of collet mechanisms adapted to support pinion blanks, means for indexing said carrier to move said collet mechanisms to successive stations, means at one of said stations for drilling the pinion blanks, means at another station for filling the pinion blanks, means at another station for knurling the filled pinion blanks, and a cam for operating said collet mechanisms, said cam being arranged to operate the mechanisms at the drilling station to chuck the work, to partially withdraw the collet mechanisms from the pinion blanks as the latter move to the knurling station and to completely withdraw the collet mechanisms from the pinion blanks as the collet mechanisms move away from the knurling station.

27. In combination, a slidable sleeve, a collet closing member thereon, means for limiting the forward movement of said sleeve, a pull back rod slidably mounted in said sleeve, a spring collet carried by said rod and cooperating with said closing member, means for limiting the sliding movement of said rod with respect to said sleeve, resilient means normally urging said sleeve forwardly of said pull back rod, resilient means for urging the pull back rod forwardly, and means cooperating with said rod for withdrawing the same.

28. In combination, a slidable pull back sleeve, a collet closing member carried thereby, a pull back rod slidably mounted in said sleeve, a spring collet connected to said rod and cooperating with said closing member, means for limiting the forward movement of said sleeve, means for permitting a limited movement of the pull back rod with respect to said sleeve and causing said sleeve and pull back rod to move in unison after the latter has been retracted to a predetermined extent, a spring normally urging said sleeve forwardly, a collet closing spring normally urging the pull back rod forwardly, and means for positively retracting said rod.

29. In combination, a supporting sleeve, a pull back sleeve slidably mounted therein, shoulders on said sleeves for limiting the forward movement of said pull back sleeve, a collet closing member on said pull back sleeve, a pull back rod slidably mounted in said pull back sleeve, a spring collet carried by said rod and cooperating with said closing member, a key for limiting the sliding movement of said rod with respect to said pull back sleeve, a washer carried by said rod, a spring between the rear end of said pull back sleeve and washer, a collet closing spring engaging said washer and normally urging the pull back rod in a direction to close the collet, and a cam for withdrawing the pull back rod.

30. In combination, a support, an index sleeve mounted in said support against longitudinal movement and for indexing movement, means for indexing said sleeve, a pull back sleeve slidably mounted in said index sleeve, a collet closing member on said pull back sleeve, a pull back rod slidably mounted in said pull back sleeve, a collet carried by said rod, means between said sleeves for limiting the forward movement of said pull back sleeve, a key carried by said pull back rod and having limited movement relative to said pull back sleeve, said key connecting said sleeves and rod so that they will be indexed in unison, a spring about said rod and engaging the rear end of said pull back sleeve, a collet closing spring about said rod and normally urging said rod forwardly, and a cam for withdrawing said pull back rod.

31. In combination, a slidably mounted collet closing member, means for limiting the forward movement of said member, a spring collet cooperating with said member, a spring normally urging the collet closing member forwardly, a spring for urging the collet forwardly into chucking position, means for withdrawing the collet and closing member, a dead center member having a center in which the work is adapted to have a bearing, and spring means carried by said dead center member and adapted to engage the end of the work.

32. In combination, a pull back sleeve, means for limiting the forward movement of said sleeve, a collet closing member carried by said sleeve, a pull back rod within said sleeve and having limited sliding movement relative thereto, a collet carried by said rod, a spring normally urging said pull back sleeve to forward position, a spring normally urging the pull back rod forwardly, means for withdrawing the pull back rod, a dead center member having a center in which the end of the work has a bearing, a pin in said center and adapted to engage the end of the work, and a spring behind said pin.

33. In combination, a pull back sleeve, a collet closing member carried thereby, means for limiting the forward movement of said pull back sleeve, a pull back rod slidably mounted in said sleeve, a collet carried by said rod, means for advancing the pull back sleeve with said pull back rod until the sleeve has reached its foremost position, a collet closing spring normally urging said rod forwardly, means for withdrawing the pull back rod, a dead center member having an opening forming a bearing for the end of the work, a pin in said opening adapted to engage the end of the work, a spring behind said pin, and a spring ejector in said collet.

34. In combination, a slidably mounted collet closing member, means for limiting the forward movement of said member, a spring collet cooperating with said member, a spring normally urging the collet closing member forwardly, a spring for urging the collet forwardly into chucking position, means for withdrawing the collet and closing member, a dead center member having a center in which the work is adapted to have a bearing, spring means carried by said dead center member and adapted to engage the end of the work, and means for feeding the work to said collet and holding the same for longitudinal movement during the chucking operation.

35. In combination, an indexible turret, means for indexing the same, a plurality of sleeves mounted in said turret for indexing movement about their own axes, means for indexing said sleeves, a collet mechanism in each of said index sleeves, and a cam for controlling all of said collet mechanisms; each of said mechanisms having a pull back sleeve slidably mounted within an index sleeve and indexible therewith, a closing member on said pull back sleeve, a pull back rod mounted in the pull back sleeve indexible therewith and having limited sliding movement relative thereto, a collet carried by said rod, a spring for advancing said rod to close the collet, and a spring between said rod and said pull back sleeve for advancing the latter in unison with the pull back rod until the forward position of the pull back sleeve is reached.

36. In combination, an indexible turret having a head and a dead center plate, a plurality of indexible collet mechanisms in said head, means for indexing said turret, means for indexing said collet mechanisms about their own axes; each of said collet mechanisms including an indexible sleeve, a pull back sleeve slidably mounted therein, a closing member carried by the pull back sleeve, a pull back rod slidably mounted in the pull back sleeve, a collet carried by the pull back rod, resilient means for urging the pull back sleeve to forward position, and resilient means for urging the pull back rod to forward position; and a cam for controlling all of said pull back rods; said dead center plate having openings aligned with said collets, and spring means in each of said openings adapted to engage the end of the work having a bearing therein.

37. In combination, an indexible carrier provided with a plurality of collet mechanisms indexible about their own axes, means for indexing said carrier, means for indexing said collet mechanisms and including ratchet wheels associated therewith, and means for locating the collet mechanisms in indexed positions, said last mentioned means including tapered openings in said ratchet wheels and tapered spring pressed plungers adapted to engage in said openings.

38. In combination, a turret, a plurality of collet mechanisms carried thereby, means including a Geneva motion device for indexing said turret to move said mechanisms from a drilling station to a filling station, and means for indexing said collet mechanisms about their own axes at each of said stations, said collet indexing means including a pawl carrying lever at each of said stations, ratchet wheels associated with the collet mechanisms, a pawl carried by each of said levers and cooperating with the wheels at said stations, a connection between said levers, and a cam for oscillating said levers and driven in timed relation to said Geneva motion device.

39. In a machine of the character described, a drilling and a filling station, means for drilling and filling pinion blanks at successive stations, means for holding the blanks at such stations, means for indexing said holding means at each station, and means for moving said holding means to the successive stations.

40. In a machine of the character described, a drilling and a filling station, a drill at a drilling station for successively drilling a plurality of holes in a pinion blank, means at a filling station for supplying wire lengths one by one to the drilled blank, chucking means for holding the pinion blank, and means for moving said chucking means to the successive stations.

41. In a machine of the character described, a plurality of stations, means at a drilling station for drilling pinion blanks, means at a filling station for filling the blanks with wires, means for holding the pinion blanks at such stations, means for indexing said holding means at such stations, means for moving the holding means from the drilling station to the filling station, and means for maintaining said holding means in indexed position while being moved from one station to another.

42. In a machine of the character described, an indexible carrier, collet mechanisms thereon adapted to support pinion blanks, means for indexing said carrier to move said mechanisms to successive stations, means at one station for drilling the blanks, means at another station for filling the blanks with wires, means for indexing said mechanisms at the drilling station and the filling station, and means for holding said mechanisms accurately in indexed positions during the drilling and filling operations and while said carrier is indexed.

43. In combination, a carrier, a plurality of means on the carrier for holding pinion blanks, means for moving said carrier to carry said holding means successively from a drilling station to a filling station, and means including a common operating mechanism for indexing in unison the holding means at the drilling station and the holding means at the filling station.

44. In combination, a slide, a tool thereon for cutting wires and carrying the same from a receiving position to a delivery position, a cam for reciprocating said slide, an adjustable connection between said cam and slide, and means for adjustably limiting the extent of movement of said slide and including a pair of abutments one of which is adjustable and a nut adjustably carried by said slide between said abutments.

45. In combination, a tool for knurling the collars of clock pinions, a member adapted to engage against a collar of the pinion for holding the collar against the tool, and operating mechanism for said member and including resilient means whereby said member yieldingly urges the collar against the tool.

46. In combination, a rotating tool for knurling the collars of clock pinions, a gear adapted to mesh with the pinion and engage behind the collar thereof, a slide on which said gear is mounted, a cam for reciprocating said slide, and an operative connection between said cam and slide including resilient means whereby the gear yieldingly urges the collar against the tool.

47. In combination, a knurling tool, pinion holding means including a pair of centers in which the pinion is journalled for free rotary and longitudinal movements, a member movable longitudinally of the centers and adapted to hold the pinions against the knurling tool, and means for controlling said member.

48. In combination, a knurling tool, a plurality of holding means each including a pair of centers for clock pinions, means for successively moving said holding means to a knurling station, a member adapted to engage the pinions at the knurling station, and operating mechanism for yieldingly urging said member in a direction to engage the pinions against the knurling tool.

PENROSE R. HOOPES.